United States Patent
Swann (10) Patent No.: US 8,041,137 B2
(45) Date of Patent: Oct. 18, 2011

(54) TILED OUTPUT MODE FOR IMAGE SENSORS

(75) Inventor: Robert Edward Swann, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 1007 days.

(21) Appl. No.: 11/682,536

(22) Filed: Mar. 6, 2007

(65) Prior Publication Data

US 2008/0219588 A1 Sep. 11, 2008

(51) Int. Cl.
*G06K 9/40* (2006.01)
(52) U.S. Cl. ......... 382/254; 348/298
(58) Field of Classification Search ......... 235/462.11, 235/462.24, 462.41; 257/E31.075, E31.078, 257/E31.081, E31.084, E27.153, E27.154, 257/E27.159, E29.234–E29.24, E21.617; 348/230.1, 236, 238, 272, 294, 298, 308, 348/E3.029, E5.092; 377/57; 386/E9.061, 386/E5.038; 438/60, 75, 144; 382/254
See application file for complete search history.

(56) References Cited

U.S. PATENT DOCUMENTS

| | | | |
|---|---|---|---|
| 5,686,960 A * | 11/1997 | Sussman et al. | 348/218.1 |
| 5,886,742 A | 3/1999 | Hibi et al. | |
| 5,973,844 A * | 10/1999 | Burger | 359/622 |
| 6,163,621 A | 12/2000 | Paik et al. | |
| 6,275,532 B1 | 8/2001 | Hibi et al. | |
| 6,285,398 B1 * | 9/2001 | Shinsky et al. | 348/223.1 |
| 6,933,973 B1 * | 8/2005 | Sako | 348/308 |
| 7,027,665 B1 | 4/2006 | Kagle et al. | |
| 7,359,563 B1 | 4/2008 | Dua et al. | |
| 2001/0021271 A1 * | 9/2001 | Ishibashi | 382/232 |
| 2003/0002746 A1 | 1/2003 | Kusaka | |
| 2003/0077064 A1 * | 4/2003 | Katayama | 386/46 |
| 2005/0025372 A1 * | 2/2005 | Kim et al. | 382/240 |
| 2005/0078755 A1 | 4/2005 | Woods et al. | |
| 2006/0188014 A1 | 8/2006 | Civanlar et al. | |
| 2006/0274170 A1 * | 12/2006 | Azuma | 348/246 |
| 2007/0133870 A1 * | 6/2007 | Hu | 382/167 |
| 2010/0118935 A1 * | 5/2010 | Kakii et al. | 375/240.01 |

OTHER PUBLICATIONS

Jiajun Zhang; Ahmad, M.O.; Swamy, M.N.S.;, "Overlapped variable size block motion compensation," Image Processing, 1997. Proceedings., International Conference on, vol. 3, No., pp. 642-645 vol. 3, Oct. 26-29, 1997 doi: 10.1109/ICIP.1997.632203 URL: http:I/ieeexplore.ieee.org/stamp/stamp.jsp?tp-&arnumber=6322038 &isnumber=13718.*

(Continued)

*Primary Examiner* — Gregory F Cunningham
(74) *Attorney, Agent, or Firm* — McAndrews, Held & Malloy, Ltd.

(57) ABSTRACT

Methods and systems for a tiled output mode for image sensors are disclosed and may comprise receiving tiled image data from an image sensor that generates output in a tiled format, and sequentially processing the received tiled image data. The received tiled image data may comprise a plurality of lines. A tile received from the image sensor may overlap at least one neighboring tile. The neighboring tiles may be above, below, to the left and/or to the right of the current tile. The size of the received tiled image data may vary dynamically, and may vary based on, for example, a compression format and/or a desired resolution of the image sensor. The method may also comprise generating the tiled image data from an image sensor, and sequentially processing the generated tiled image data.

36 Claims, 5 Drawing Sheets

OTHER PUBLICATIONS

Jiajun Zhang; Ahmad, M.O.; Swamy, M.N.S.;, "Overlapped variable size block motion compensation," Image Processing, 1997. Proceedings., International Conference on , vol. 3, No., pp. 642-645 vol. 3, Oct. 26-29, 1997 doi: 10.1109/ICIP.1997.632203 URL: http://ieeexplore.ieee.org/stamp/stamp.jsp?tp-&arnumber=632203&isnumber=13718.

Office Action dated Apr. 27, 2011 for U.S. Appl. No. 11/939,956, filed Nov. 14, 2007.

* cited by examiner

FIG. 2
PRIOR ART

PRIOR ART

TILED OUTPUT MODE FOR IMAGE SENSORS

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to data transfer. More specifically, certain embodiments of the invention relate to a method and system for a tiled output mode for image sensors.

BACKGROUND OF THE INVENTION

Cellular phones have developed from large, expensive devices typically used only in cars and owned only by a small percentage of the population to miniature, inexpensive, and ubiquitous handheld devices, and are even more numerous than traditional land-line phones in countries with poor fixed-line infrastructure. Cellular handsets have incorporated text messaging, email, connection to the Internet, PDAs, and even personal computers.

Cellular phones with built-in cameras, or camera phones, have become prevalent in the mobile phone market, due to the low cost of CMOS image sensors and the ever increasing customer demand for more advanced cellular phones. As camera phones have become more widespread, their usefulness has been demonstrated in many applications, such as casual photography, but have also been utilized in more serious applications such as crime prevention, recording crimes as they occur, and news reporting.

Historically, the resolution of camera phones has been limited in comparison to typical digital cameras, due to the fact that they must be integrated into the small package of a cellular handset, limiting both the image sensor and lens size. In addition, because of the stringent power requirements of cellular handsets, large image sensors with advanced processing have been difficult to incorporate. However, due to advancements in image sensors, multimedia processors, and lens technology, the resolution of camera phones has steadily improved rivaling that of many digital cameras.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for a tiled output mode for image sensors, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for a tiled output mode for image sensors. Exemplary aspects of the invention may include receiving tiled image data from an image sensor that generates output in a tiled format, and sequentially processing the received tiled image data. The received tiled image data may comprise a plurality of lines. A tile received from the image sensor may overlap at least one neighboring tile. The neighboring tiles may be below, to the left and to the right of the current tile. The size of the received tiled image data may vary dynamically, and may vary based on a compression format and/or a desired resolution of the image sensor. The method may also comprise generating the tiled image data from an image sensor, and sequentially processing the generated tiled image data.

Figure 1:
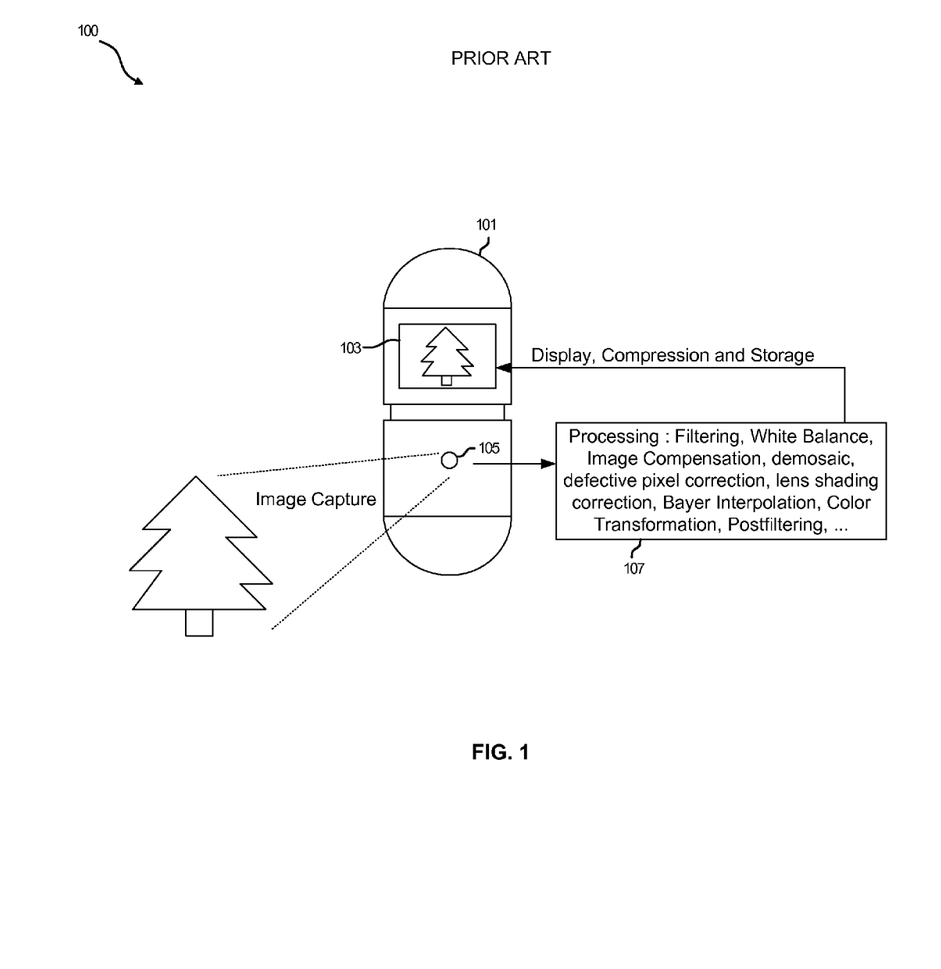
FIG. 1 is a block diagram of an exemplary application of an image sensor in a mobile communication device, in connection with an embodiment of the invention.

FIG. 1 is a block diagram of an exemplary application of an image sensor in a mobile communication device, in connection with an embodiment of the invention. Referring to FIG. 1, there is shown an image sensor application 100 comprising a mobile communication device 101 with a display screen 103, an image sensor 105 and a processing block 107. The mobile communication device 101 may comprise suitable circuitry, logic and/or code for communicating over a cellular network and capturing, processing, storing and/or displaying an image generated by the image sensor 105. The display screen 103 may comprise suitable circuitry, logic and/or code for displaying an image generated by the image sensor 105 and the processing block 107. The image sensor 105 may comprise a multi-megapixel CCD, CMOS or related technology sensor array that may be enabled to detect a visual image and generate digital data representing that image.

The processing block 107 may comprise suitable circuitry, logic and/or code for processing the image data received from the image sensor 105. The processing steps, or image sensor pipeline (ISP), performed by the processing block 107 may comprise, for example, filtering, demosaic, lens shading correction, defective pixel correction, white balance, image compensation, Bayer interpolation, color transformation, and post filtering.

In operation, the image sensor 105 in the mobile communication device 101 may perform an image capture. The image data may be transferred to the processor block 107 in a line-by-line basis. In this regard, the data for a complete row of pixels may be transferred before the next row of pixels is transferred to the processor block 107. This process is described further with respect to FIG. 3. Once a suitable number of entire rows are transferred to the processor block 107, the data may be subjected to processing. The processing may comprise filtering, white balance, image compensation, for example. For example, 16 rows may be transferred to the processor block 107 for processing. The data may then be compressed, stored and/or displayed on the display screen 103.

Figure 2:
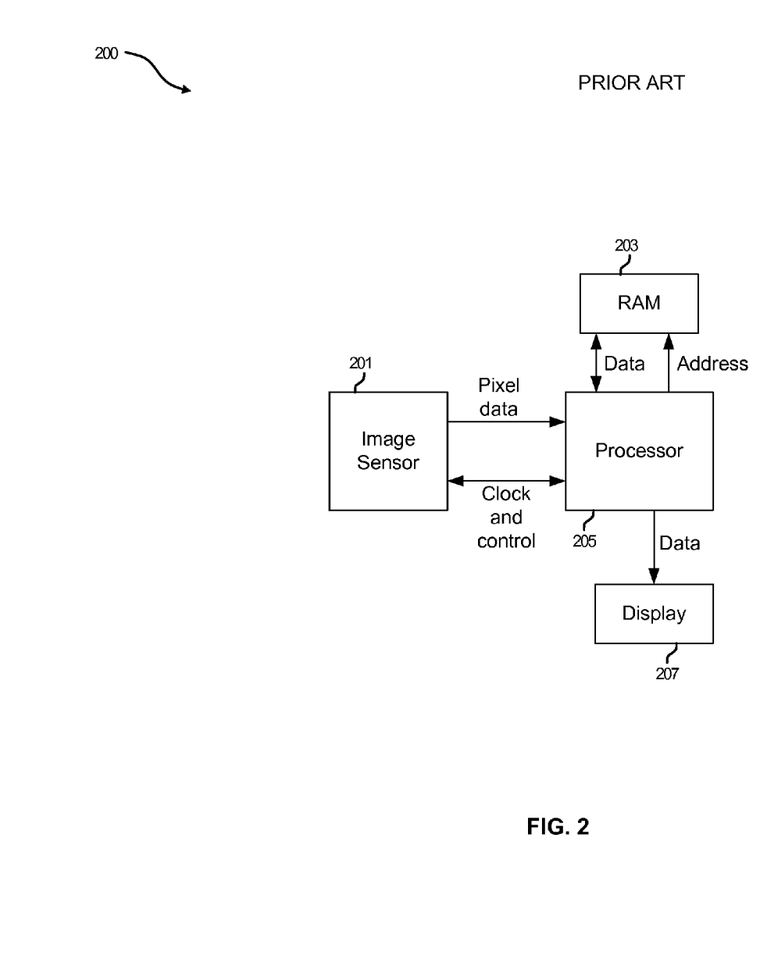
FIG. 2 is a block diagram of an exemplary digital imaging system, in connection with an embodiment of the invention.

FIG. 2 is a block diagram of an exemplary digital imaging system, in connection with an embodiment of the invention. Referring to FIG. 2, there is shown a digital imaging system 200 comprising an image sensor 201, a RAM 203, a processor 205 and a display 207.

The image sensor 201 and the display 207 may be substantially similar to the image sensor 105 and the display screen 103, described with respect to FIG. 1. The RAM 203 may comprise suitable circuitry, logic and/or code for storing data. The processor 207 may comprise suitable circuitry, logic and/or code that may be enabled to send control signals to and receive data from the image sensor 201 and the RAM 203. The processor 205 may also be enabled to communicate data to the display 207. The processing steps may be substantially similar to the processing steps performed by the processing block 107, described with respect to FIG. 1.

In operation, the image sensor may generate image data from an image capture and transfer this data to the processor 205. The processor 205 may provide clock and control signals for synchronizing the data transfer from the image sensor 201. The data may be communicated to the processor 205 for processing in the ISP, as described with respect to FIG. 1. The data may be communicated to the display 207 for viewing and/or may be compressed by the processor 205 and stored in the RAM 203. The processor 205 may communicate address data to the RAM 203 to determine where to read or write data in the RAM 203.

Figure 3:
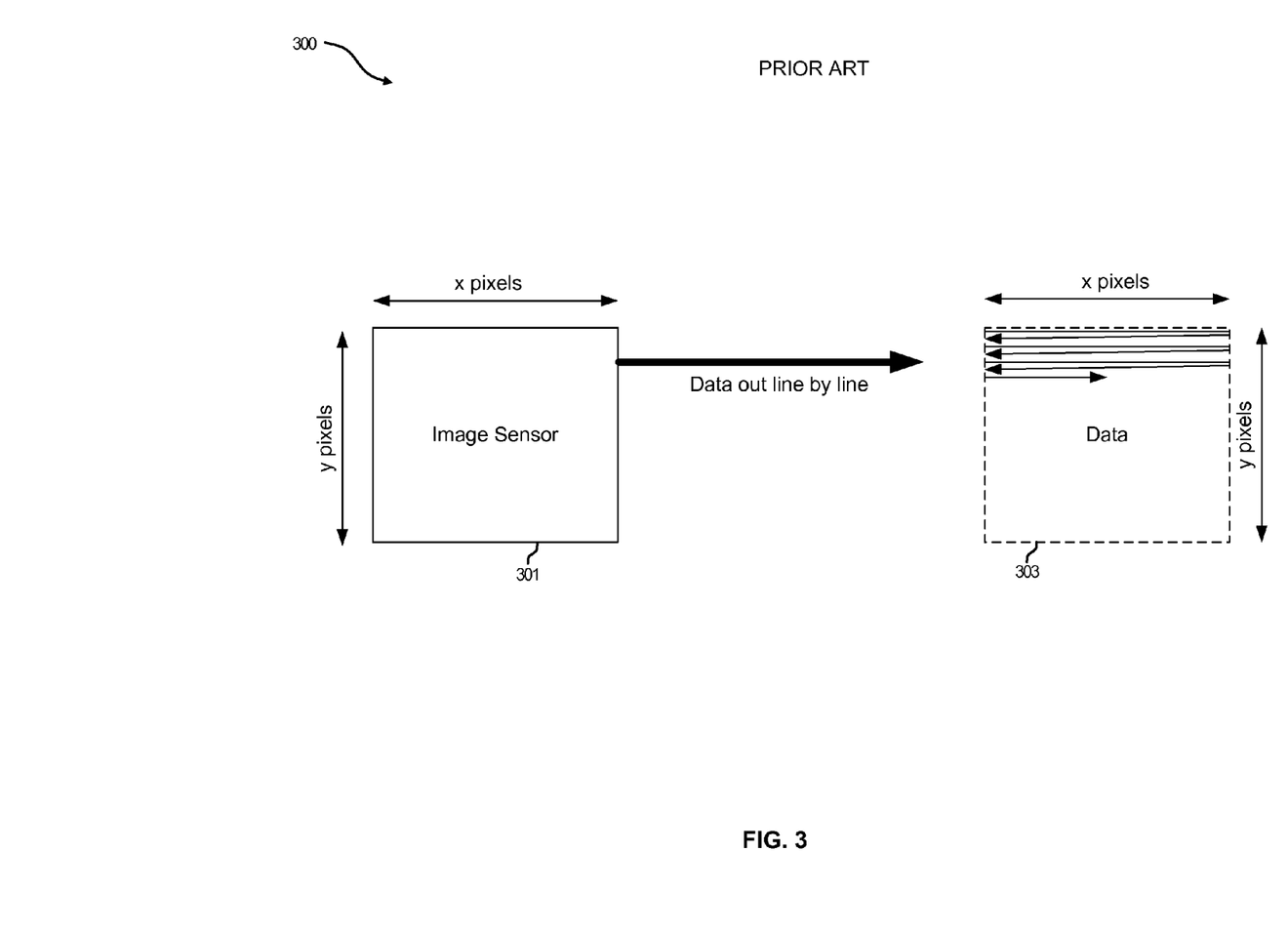
FIG. 3 is a block diagram of an exemplary linear data transfer from an image sensor, in connection with an embodiment of the invention.

FIG. 3 is a block diagram of an exemplary linear data transfer from an image sensor, in connection with an embodiment of the invention. Referring to FIG. 3, there is shown an image sensor 301 and an image data array 303. The image sensor 301 may be substantially similar to the image sensor 105 described with respect to FIG. 1. The image data array 303 may comprise a data array with x columns and y rows of data, where x may be the number of pixels in the horizontal direction and y may be the number of pixels in the vertical direction.

In operation, the data from an image capture may be communicated from the image sensor 301 one line at a time. Each pixel data of a row may be transferred before the next row of data may be transferred. Because typical image processing techniques may be performed on two-dimensional blocks of data, the lines of data communicated from the image sensor 301 may be stored in a processor buffer or external memory, such as the RAM 203, until enough rows, at least 16, for example, have been read out to fill a row of processing blocks. When enough rows have been read out, a processor, such as the processor 205 described with respect to FIG. 2, may begin processing the data. As the number of pixels in image sensors continues to increase, this row storage may place excessive memory requirements on the system, which may be very undesirable in a handheld device, especially if cost is an important feature. In addition, since more data may be read out and stored in a buffer than what may be needed to start processing the first block, the speed of the system may be reduced.

Figure 4:
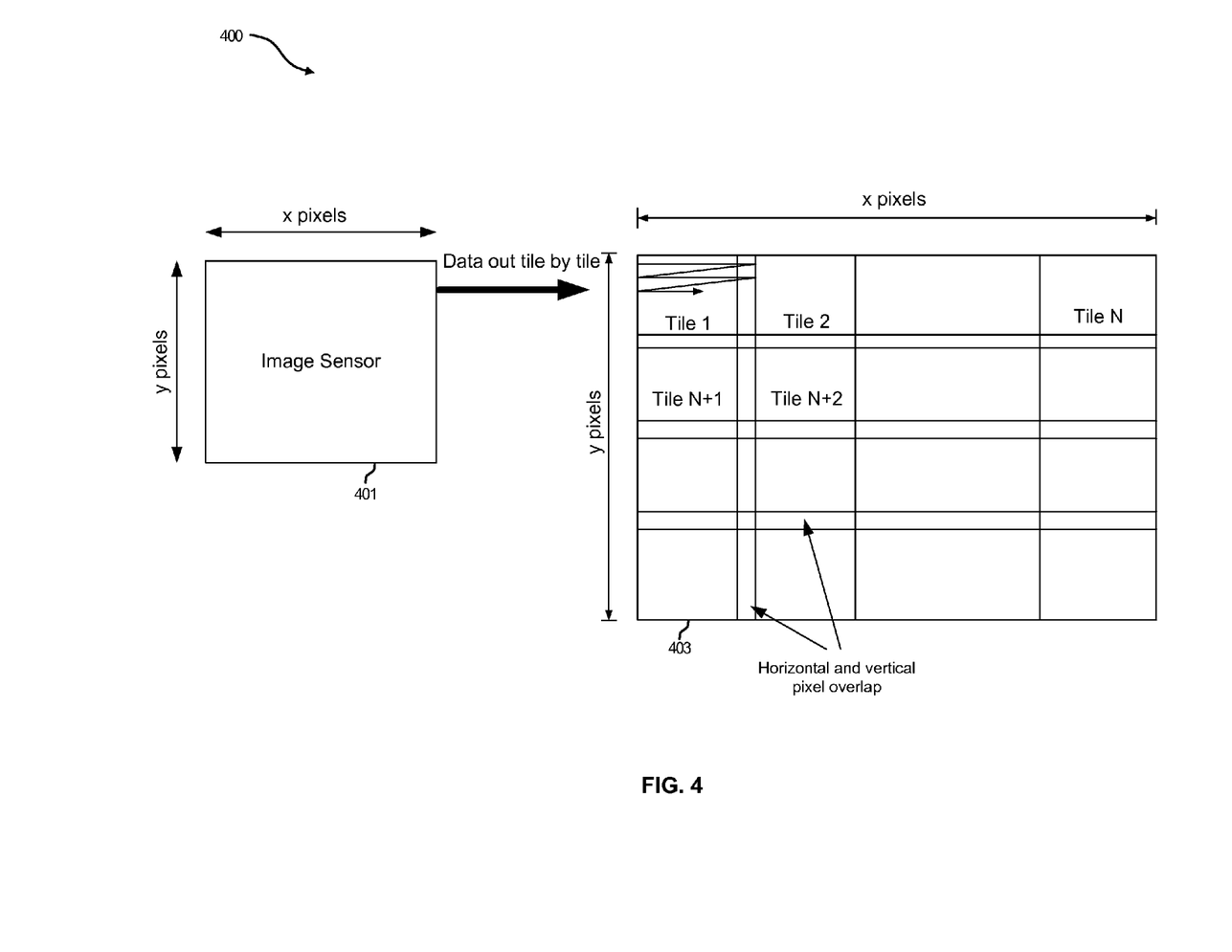
FIG. 4 is a block diagram of an exemplary tile data transfer from an image sensor, in accordance with an embodiment of the invention.

FIG. 4 is a block diagram of an exemplary tile data transfer from an image sensor, in accordance with an embodiment of the invention. Referring to FIG. 4, there is shown an image sensor 401 and an image data array 403. The image sensor 401 may comprise a multi-megapixel CCD, CMOS or related technology sensor array that may be enabled to detect a visual image and generate digital data representing that image. The image sensor 401 may be enabled to communicate image data in tiles, as opposed to line-by-line. In this regard, the tiles or blocks of pixels may be addressed individually, as opposed to lines of pixels. In another embodiment of the invention, circuitry coupled to the image sensor 401 may be enabled to read the image data in tiles as opposed to lines, without the requirement of a different sensor design. The image sensor 401 may be incorporated into a cellular phone, a digital camera, a portable multimedia device, or any system incorporating an image sensor.

The image data array 403 may comprise a data array with x columns and y rows of data, where x may be the number of pixels in the horizontal direction and y may be the number of pixels in the vertical direction. The image data array 403 may comprise a number of tiles of a variable width and height. Each tile may overlap with neighboring tiles by a variable number of pixels, up to 64 for example, to reduce edge effects in the processing of adjacent tiles.

In operation, the data from an image capture may communicated out of the image sensor 401 a block at a time. The memory requirements may be reduced since less than a single tile may require storage in a buffer before the data may be processed by a processor enabled to handle data in the appropriate tile size. The processing may comprise filtering, demosaic, lens shading correction, defective pixel correction, white balance, image compensation, Bayer interpolation, color transformation and post filtering, for example.

The data may be communicated to a display and/or compressed into JPEG, MPEG, or other format and stored in memory. In this manner, the memory requirements may be reduced and the speed may be increased, since the processing of the data may commence as soon as a single tile may be communicated from the image sensor, as opposed to a number of entire rows in a conventional design. Also, the amount of local memory in the processor, or cache, and the data traffic between the processor and the memory may be reduced due to the small size of the tile, as compared to the conventional process where data may be stored in RAM due to the large size of data from multiple rows.

Figure 5:
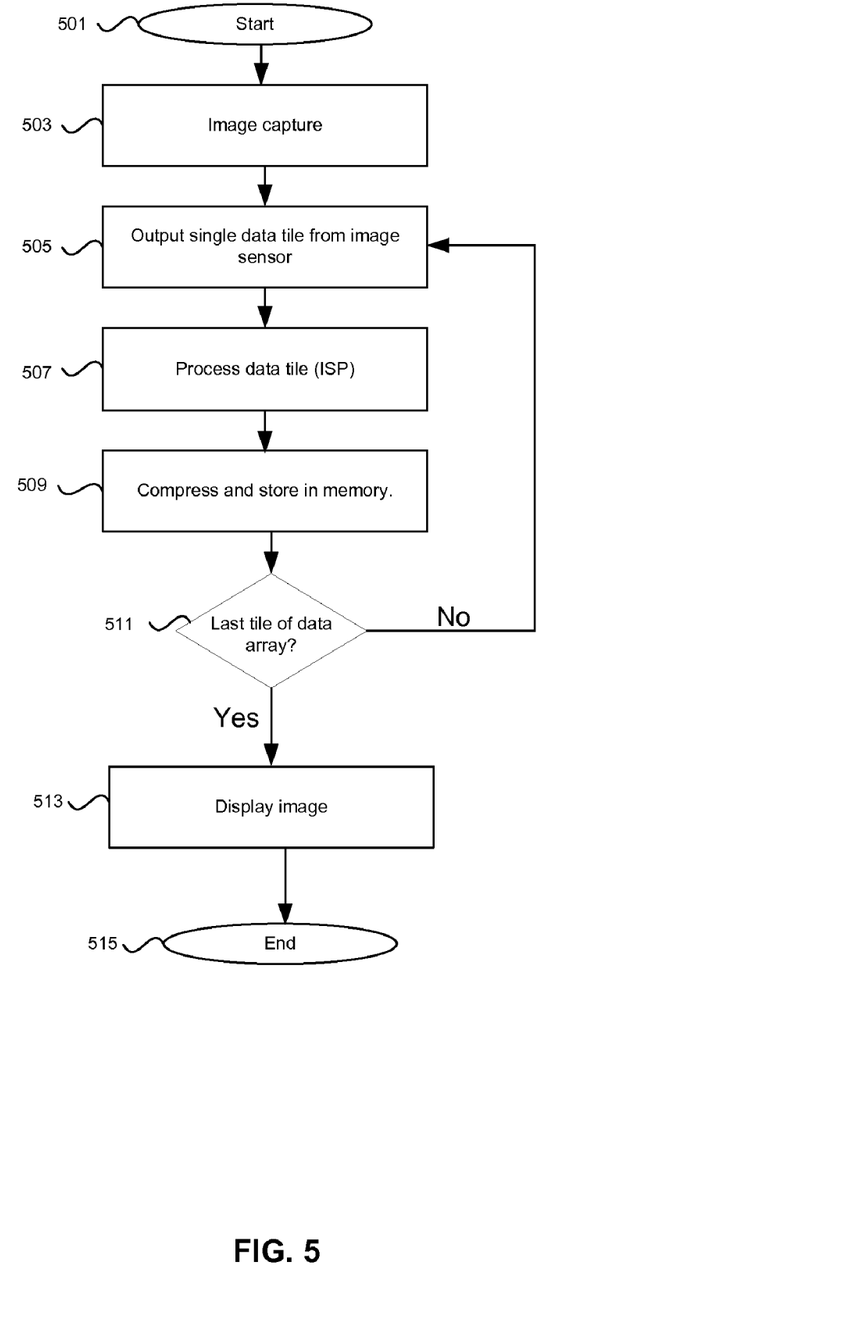
FIG. 5 is a flow diagram illustrating an exemplary process for image sensing and processing.

FIG. 5 is a flow diagram illustrating an exemplary process for image sensing and processing. Referring to FIG. 5, following start step 501, in step 503 the image sensor 401 may capture an image. In step 505, the image sensor 401 may output the data from a single tile, followed by step 507 where the data tile may be processed with techniques such as filtering, demosaic, lens shading correction, defective pixel correction, white balance, image compensation, Bayer interpolation, color transformation and post filtering, for example. In step 509, the processed data may be compressed and stored in memory. In step 511, if the processed tile may be the last tile of the data array 403, the process may proceed to step 513 where the image is displayed, followed by end step 515. If, in step 511, if the processed tile is not the last tile, the process may proceed to step 505, where the next data tile may be output to a processor. This loop may repeat until the final data tile is processed and stored. The image may be displayed in step 513.

In an embodiment of the invention, tiled image data may be received from an image sensor 401 that generates output image data in a tiled format. The received tiled image data may be sequentially processed. The image data array 403 may comprise a plurality of the received tiled image data that may comprise a plurality of lines. A tile received from the image sensor 401 may overlap at least one neighboring tile. The neighboring tiles may be below, above, to the left and/or to the right of the current tile. The size of the received tiled image data may vary dynamically, and may vary based on a compression format and/or a desired resolution of the image sensor 401.

Another embodiment of the invention may comprise generating the tiled image data from an image sensor 401, and sequentially processing the generated tiled image data. The image sensor 401 may be specifically designed to output tiled image data, or supporting sensor circuitry may be utilized to output the tiled image data.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing images, the method comprising:
    in a wireless device, receiving for processing, tiled image data from an image sensor that generates output in a tiled format, wherein each tile of said tiled image data comprises data from a two-dimensional sub-section of said image sensor, and wherein at least one tile of said received tiled image data from said image sensor overlaps at least one other tile of said received tiled image data from said image sensor.

2. The method according to claim 1, comprising sequentially processing said received tiled image data.

3. The method according to claim 1, wherein said received tiled image data comprises a plurality of lines.

4. The method according to claim 1, wherein a current tile of said received tiled image data from said image sensor overlaps at least one neighboring tile of said received tiled image data from said image sensor.

5. The method according to claim 4, wherein said at least one neighboring tile is one or more of: above said current tile, below said current tile, left of said current tile, and right of said current tile.

6. The method according to claim 1, wherein a size of said received tiled image data varies.

7. The method according to claim 1, wherein a size of said received tiled image data varies dynamically.

8. The method according to claim 1, wherein a size of said received tiled image data varies based on a compression format.

9. The method according to claim 1, wherein a size of said received tiled image data varies based on a desired resolution of said image sensor.

10. A method for processing images, the method comprising:
    in a wireless device, generating tiled image data from an image sensor for processing, wherein each tile of said tiled image data comprises data from a two-dimensional sub-section of said image sensor, and wherein at least one tile of said generated tiled image data from said image sensor overlaps at least one other tile of said generated tiled image data from said image sensor.

11. The method according to claim 10, comprising sequentially processing said generated tiled image data.

12. The method according to claim 10, wherein said generated tiled image data comprises a plurality of lines.

13. The method according to claim 10, wherein a current tile of said tiled image data generated by said image sensor overlaps at least one neighboring tile of said tiled image data generated from said image sensor.

14. The method according to claim 13, wherein said at least one neighboring tile is one or more of: above said current tile, below said current tile, left of said current tile, and right of said current tile.

15. The method according to claim 10, wherein a size of said generated tiled image data varies.

16. The method according to claim 10, wherein a size of said generated tiled image data varies dynamically.

17. The method according to claim 10, wherein a size of said generated tiled image data varies based on a compression format.

18. The method according to claim 10, wherein a size of said generated tiled image data varies based on a desired resolution of said image sensor.

19. A system for processing images, the system comprising:
   circuitry in a wireless device that enables receipt of tiled image data from an image sensor that generates output in a tiled format for processing, wherein each tile of said tiled image data comprises data from a two-dimensional sub-section of said image sensor, and wherein at least one tile of said received tiled image data from said image sensor overlaps at least one other tile of said received tiled image data from said image sensor.

20. The system according to claim 19, wherein said circuitry enables sequentially processing said received tiled image data.

21. The system according to claim 19, wherein said tiled image data comprises a plurality of lines.

22. The system according to claim 19, wherein a current tile of said received tiled image data from said image sensor overlaps at least one neighboring tile of said received tiled image data from said image sensor.

23. The system according to claim 22, wherein at least one neighboring tile is one or more of: above said current tile, below said current tile, left of said current tile, and right of said current tile.

24. The system according to claim 19, wherein a size of said tile varies.

25. The system according to claim 19, wherein a size of said tiled image data varies dynamically.

26. The system according to claim 19, wherein a size of said received tiled image data varies based on a compression format.

27. The system according to claim 19, wherein a size of said tiled image data varies based on a desired resolution of said image sensor.

28. A system for processing images, the system comprising:
   a semiconductor image sensor that generates tiled image data for processing, wherein each tile of said tiled image data comprises data from a two-dimensional sub-section of said image sensor, and wherein at least one tile of said generated tiled image data from said image sensor overlaps at least one other tile of said generated tiled image data from said image sensor.

29. The system according to claim 28, wherein said image sensor enables sequentially processing said generated tiled image data.

30. The system according to claim 28, wherein said tiled image data comprises a plurality of lines.

31. The system according to claim 28, wherein a current tile of said tiled image data generated by said image sensor overlaps at least one neighboring tile of said tiled image data generated by said image sensor.

32. The system according to claim 31, wherein said at least one neighboring tile is at least one of: above said current tile, below said current tile, left of said current tile, and right of said current tile.

33. The system according to claim 28, wherein a size of said tiled image data varies.

34. The system according to claim 28, wherein a size of said tiled image data varies dynamically.

35. The system according to claim 28, wherein a size of said generated tiled image data varies based on a compression format.

36. The system according to claim 28, wherein a size of said generated tiled image data varies based on a desired resolution of said image sensor.

* * * * *